(12) United States Patent
Tuxen et al.

(10) Patent No.: US 11,938,375 B2
(45) Date of Patent: *Mar. 26, 2024

(54) SYSTEM AND METHOD FOR DETERMINING A SPIN AXIS OF A SPORTS BALL

(71) Applicant: TRACKMAN A/S, Vedbaek (DK)

(72) Inventors: Fredrik Tuxen, Rungsted Kyst (DK);
Michael Ungstrup, Vedbaek (DK);
Kasper Mackeprang, Vedbaek (DK)

(73) Assignee: TRACKMAN A/S, Vedbaek (DK)

( * ) Notice: Subject to any disclaimer, the term of this patent is extended or adjusted under 35 U.S.C. 154(b) by 36 days.

This patent is subject to a terminal disclaimer.

(21) Appl. No.: 17/819,098

(22) Filed: Aug. 11, 2022

(65) Prior Publication Data
US 2022/0387851 A1 Dec. 8, 2022

Related U.S. Application Data

(63) Continuation of application No. 16/949,250, filed on Oct. 21, 2020, now Pat. No. 11,446,546, which is a
(Continued)

(51) Int. Cl.
*A63B 24/00* (2006.01)
*A63B 69/36* (2006.01)
(Continued)

(52) U.S. Cl.
CPC ...... *A63B 24/0021* (2013.01); *A63B 69/3658* (2013.01); *G01S 13/58* (2013.01);
(Continued)

(58) Field of Classification Search
CPC ............ A63B 69/3658; A63B 24/0021; A63B 2024/0034; A63B 2220/35; G01S 13/88; G01S 13/58
See application file for complete search history.

(56) References Cited

U.S. PATENT DOCUMENTS 5,926,780 A * 7/1999 Fox ...................... A63B 24/0021
702/150
6,244,971 B1 * 6/2001 Mihran ............... A63B 24/0021
473/378
(Continued)

FOREIGN PATENT DOCUMENTS

CN 1928589 3/2007
CN 101057158 10/2007
(Continued)

*Primary Examiner* — Jeffrey S Vanderveen
(74) *Attorney, Agent, or Firm* — Fay Kaplun & Marcin, LLP

(57) ABSTRACT

A system determining a spin axis of a ball includes a radar transmitting a signal into a target area. The radar includes a minimum of three receivers arranged so that two pairs of receivers are not co-linear. The system also includes a Processing Unit ("PU") receiving data from the radar and determining a radar range of frequencies received at a point in time corresponding to differing velocities relative to the radar of different portions of the ball as the ball is spinning. PU divides the radar frequency range into a plurality of frequency components and calculating, for each of the frequency components, an angular position associated therewith. PU identifies as a projection of the spin axis in a plane perpendicular to a line of sight from the radar to the ball, a line perpendicular to a line represented by the determined angular positions.

22 Claims, 7 Drawing Sheets

Related U.S. Application Data continuation of application No. 16/215,793, filed on Dec. 11, 2018, now Pat. No. 10,850,179.

(60) Provisional application No. 62/642,369, filed on Mar. 13, 2018.

(51) Int. Cl.
    *G01S 7/35*     (2006.01)
    *G01S 13/58*     (2006.01)
    *G01S 13/88*     (2006.01)

(52) U.S. Cl.
    CPC ............ *G01S 13/583* (2013.01); *G01S 13/88* (2013.01); *A63B 2024/0034* (2013.01); *A63B 2220/35* (2013.01); *G01S 7/356* (2021.05)

(56) References Cited

U.S. PATENT DOCUMENTS

| | | | | |
|---|---|---|---|---|
| 10,850,179 | B2* | 12/2020 | Tuxen | A63B 69/3658 |
| 11,446,546 | B2* | 9/2022 | Tuxen | A63B 24/0021 |
| 2006/0128489 | A1* | 6/2006 | Mooney | A63B 24/0021 |
| | | | | 473/146 |
| 2007/0105637 | A1* | 5/2007 | Shimizu | A63B 71/06 |
| | | | | 473/151 |
| 2007/0293331 | A1* | 12/2007 | Tuxen | G01S 13/88 |
| | | | | 473/199 |
| 2008/0021651 | A1* | 1/2008 | Seeley | A63B 24/0021 |
| | | | | 702/152 |
| 2010/0184563 | A1* | 7/2010 | Molyneux | A43B 5/00 |
| | | | | 473/570 |
| 2011/0275462 | A1* | 11/2011 | Saegusa | A63B 37/0012 |
| | | | | 427/248.1 |
| 2013/0130843 | A1* | 5/2013 | Burroughs | G01S 13/751 |
| | | | | 473/415 |
| 2014/0191896 | A1* | 7/2014 | Johnson | G01S 13/58 |
| | | | | 342/104 |
| 2015/0087443 | A1* | 3/2015 | Kitazaki | A63B 37/0039 |
| | | | | 473/373 |
| 2016/0306035 | A1* | 10/2016 | Johnson | G01S 13/878 |
| 2017/0254892 | A1* | 9/2017 | Tuxen | G01S 13/88 |

FOREIGN PATENT DOCUMENTS

| | | |
|---|---|---|
| CN | 101384308 | 3/2009 |
| CN | 106872980 | 6/2017 |
| JP | 2014-182032 A | 9/2014 |
| WO | 2005/116678 | 12/2005 |
| WO | 2015/084928 | 6/2015 |

* cited by examiner

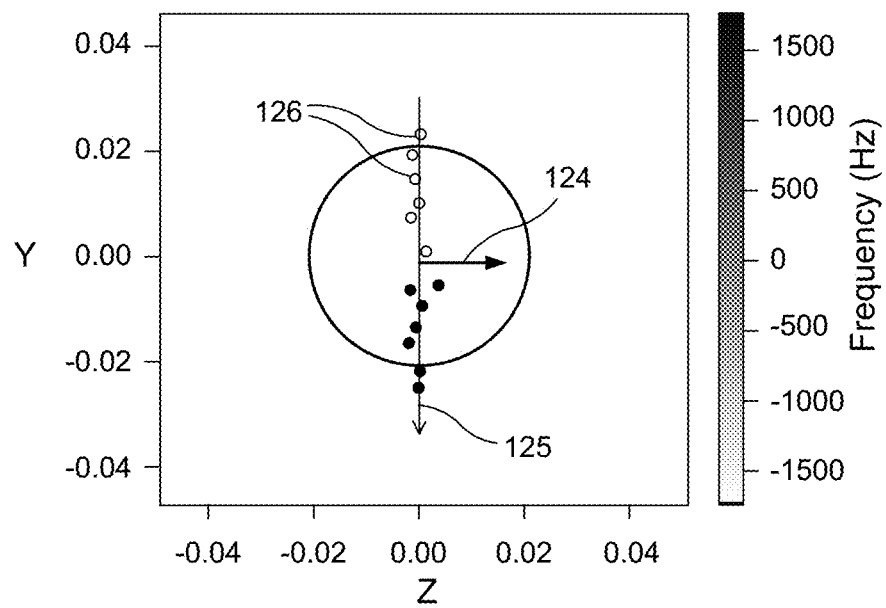
F I G. 9
Power Spectrum
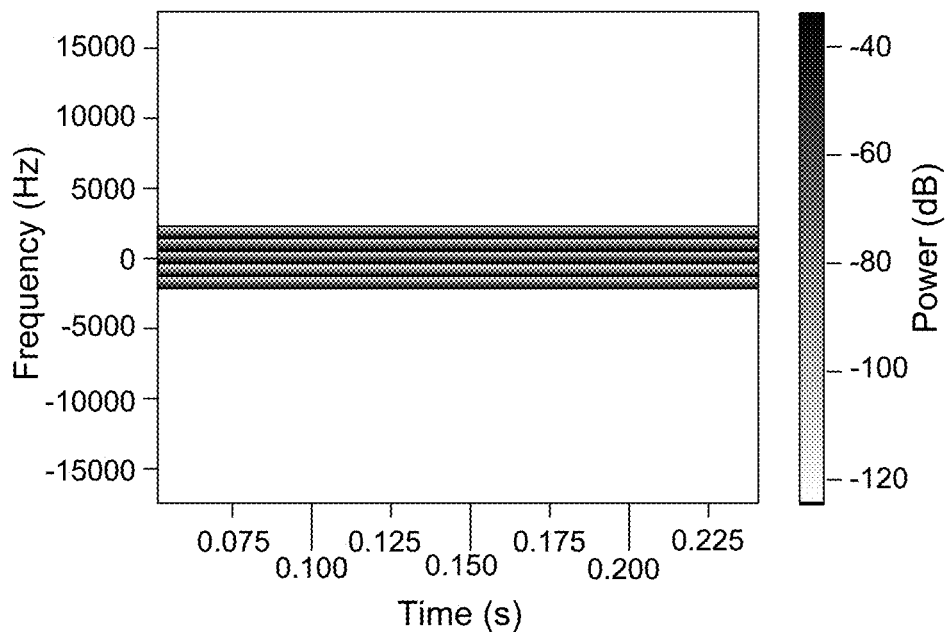
F I G. 10

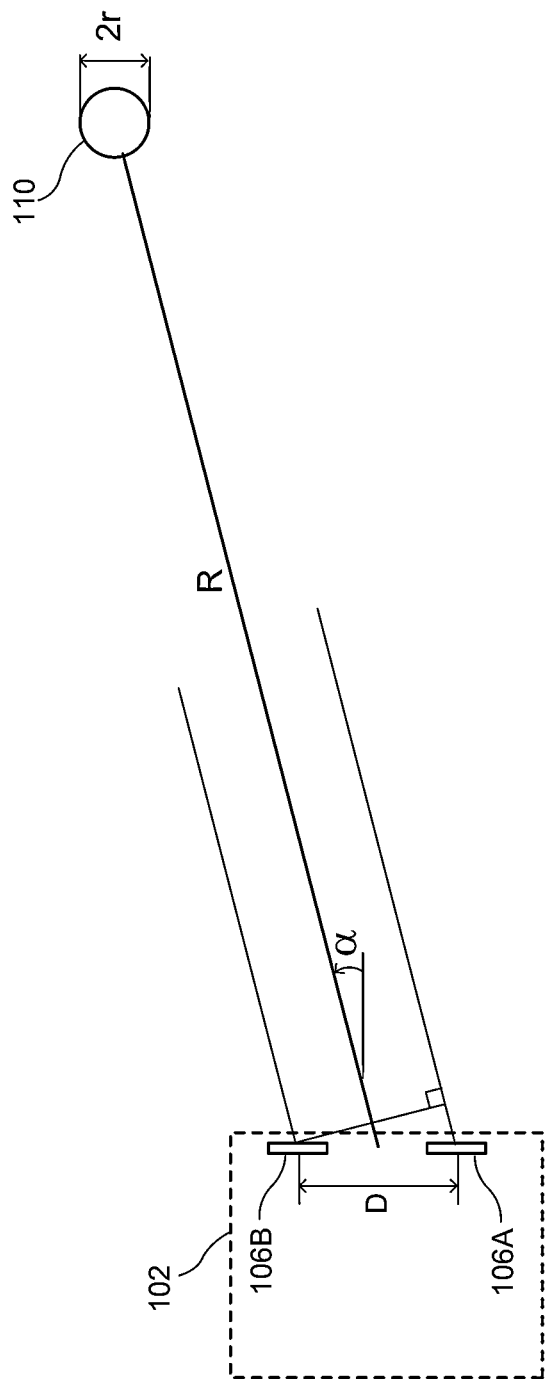
F I G. 11

SYSTEM AND METHOD FOR DETERMINING A SPIN AXIS OF A SPORTS BALL

PRIORITY CLAIM

The present application is a Continuation of U.S. patent application Ser. No. 16/949,250 filed on Oct. 21, 2020, now U.S. Pat. No. 11,446,546; which is a Continuation of U.S. patent application Ser. No. 16/215,793 filed on Dec. 11, 2018, now U.S. Pat. No. 10,850,179; which claims priority to U.S. Provisional Patent Application Ser. No. 62/642,369 filed Mar. 13, 2018. The entire disclosure of these patent(s)/application(s) is expressly incorporated herewith by reference.

BACKGROUND

Spin parameters such as the spin rate and orientation of the spin axis of a sports ball are highly useful both for tracking sports balls, for simulating the flight of sports balls and for developing sports equipment such as golf balls, clubs, irons, rackets, bats or the like used for launching sports balls. For golf balls, such determinations normally have been made by adding strips or patterns of visual markers or radar reflecting material to the golf balls. Such solutions, however, are generally useful only for test purposes and not in applications where golfers are free to use the ball of their choice without alteration.

SUMMARY

The present invention relates to a system for determining a spin axis of a sports ball comprising a first radar transmitting a signal into a target area into which the sports ball is to be launched, the first radar including a minimum of three receivers arranged so that two pairs of receivers are not co-linear and a processing unit receiving data from the first radar and determining a first radar range of frequencies received at a first point in time corresponding to differing velocities relative to the first radar of different portions of the ball as the ball is spinning, the processing unit dividing the first radar frequency range into a plurality of frequency components and calculating, for each of the frequency components, an angular position associated with each of the frequency components, the processing unit identifying as a first projection of the spin axis in a plane perpendicular to a line of sight from the first radar to the sports ball, a line perpendicular to a line represented by the determined angular positions.

The present invention also relates to a method for determining a spin axis of a sports ball. The method includes transmitting a signal, via a first radar, into a target area into which the sports ball is to be launched, the first radar including three receivers arranged so that a minimum of three receivers are not co-linear, the signal being reflected back to the receivers by the sports ball; receiving, by the first radar, the reflected signal via the receivers; performing a frequency analysis on the reflected signal received by the first radar at a first point in time to determine a range of frequencies received by the first radar corresponding to differing velocities relative to the radar of different portions of the sports ball as the sports ball is spinning; separating the received signal into a plurality of frequency components; and determining an angular position corresponding to each of the frequency components and identifying as a projection of the spin axis of the sports ball onto a plane perpendicular to a line perpendicular to a line of sight from the first radar to the sports ball, a line represented determined by the angular positions.

In addition, the present invention relates to a method for determining a spin axis of a sports ball. The method includes transmitting a signal, via a first radar, into a target area into which the sports ball is to be launched, the first radar including three receivers arranged so that a minimum of three receivers are not co-linear, the signal being reflected back to the receivers by the sports ball; receiving, by the first radar, the reflected signal via the receivers; determining an angular position of the sports ball relative to the first radar; and performing a frequency analysis on the reflected signal received by the first radar and, based on the frequency analysis, calculating a derivative of phase differences observed at the receivers with respect to frequency and, based on this derivative and the angular position of the sports ball, identifying a principle axis of rotation of the sports ball.

BRIEF DESCRIPTION

Figure 1:
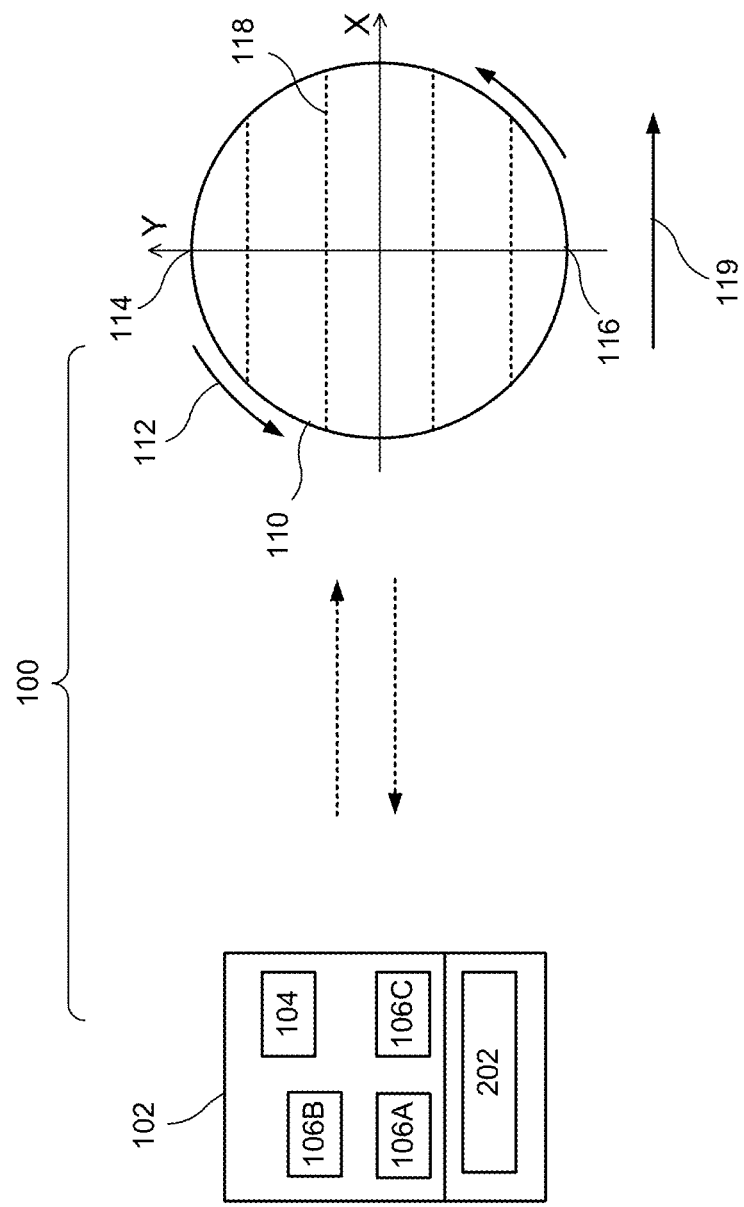
FIG. 1 shows a system for determining a spin axis of a sports ball according to an exemplary embodiment of the present invention.
Figure 2:
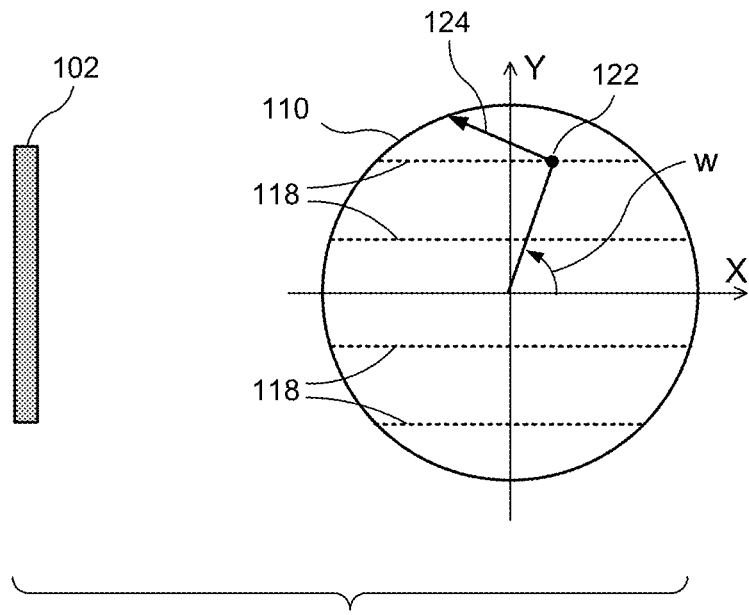
FIG. 2 shows a side view of a radar and a spinning sports ball of the system of FIG. 1 according to an exemplary embodiment of the present invention.
Figure 3:
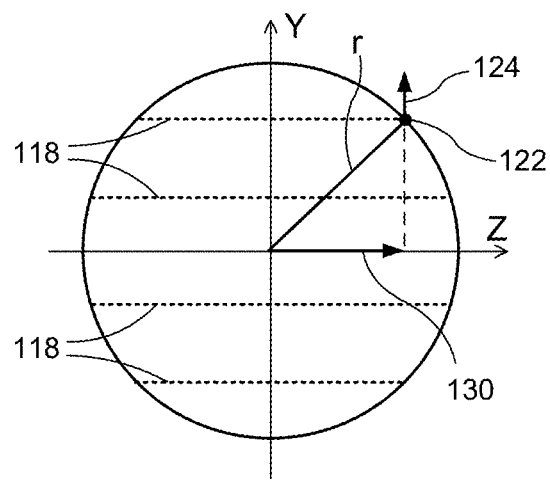
FIG. 3 shows a spinning sports ball as seen from a radar of the system of FIG. 1.
Figure 4:
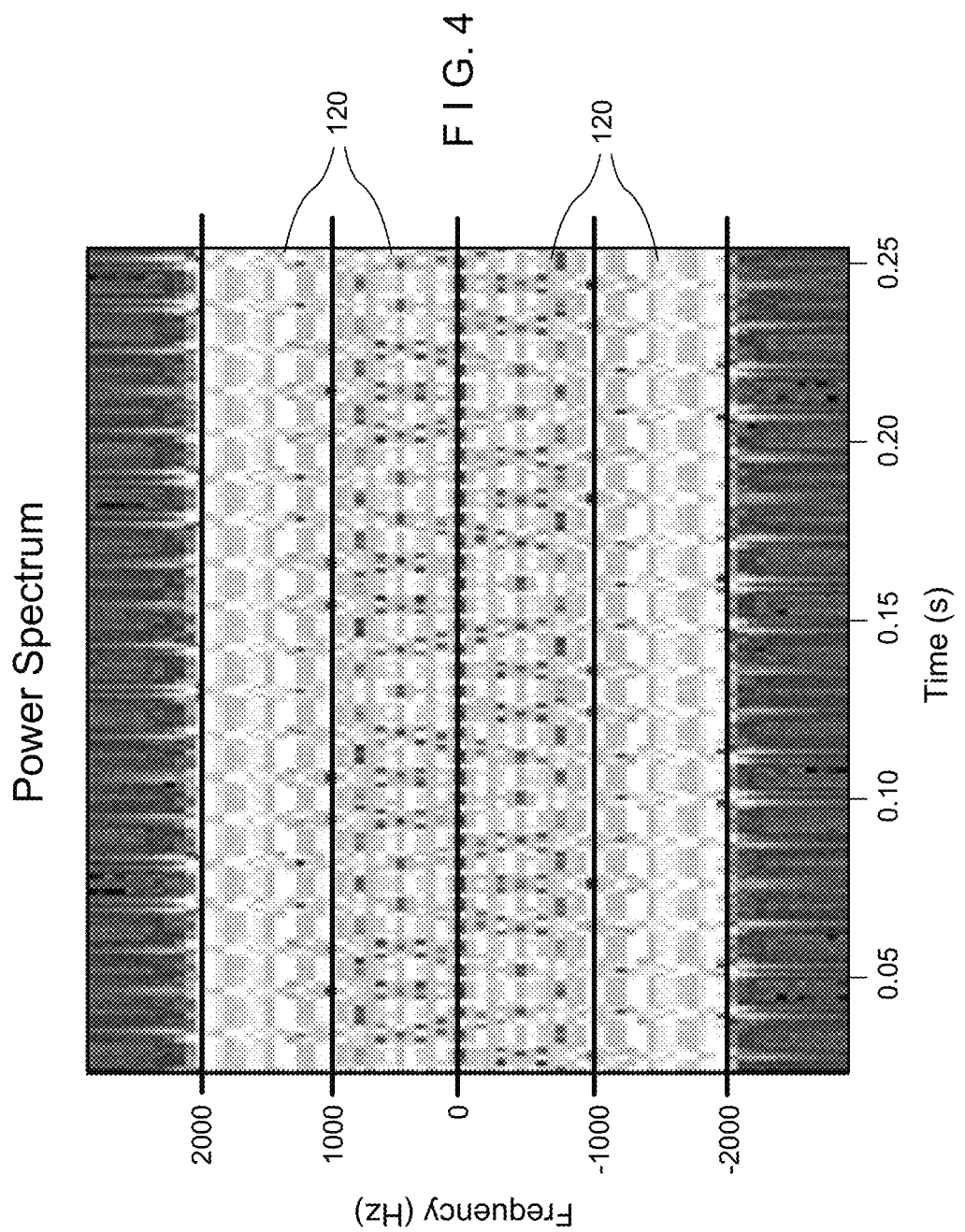
Figure 5:
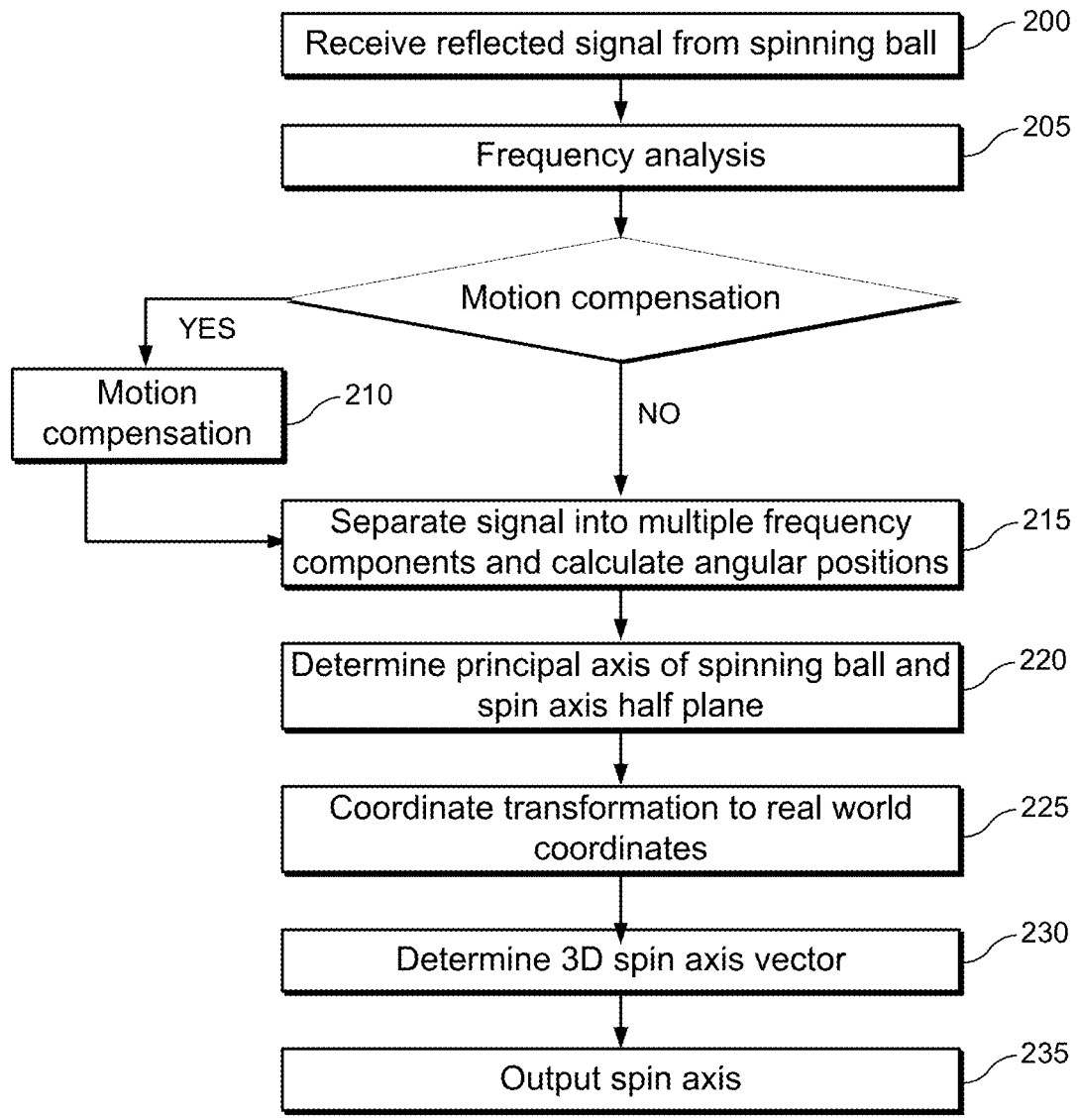
Figure 6:
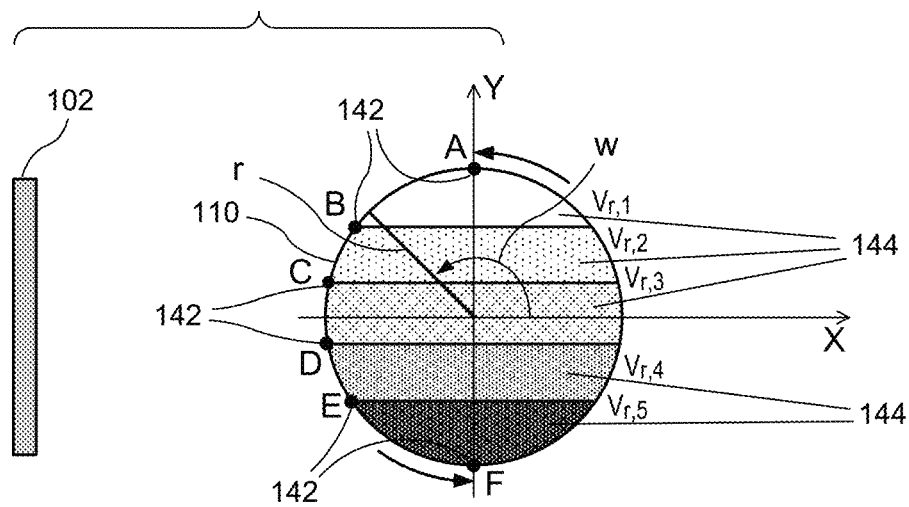
Figure 7:
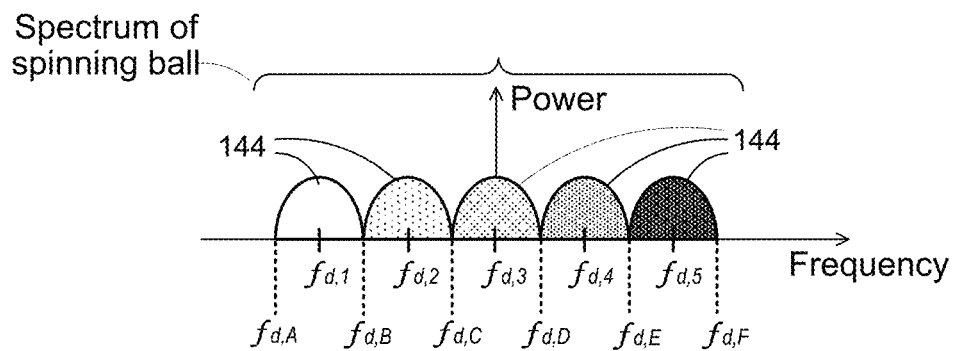
Figure 8:
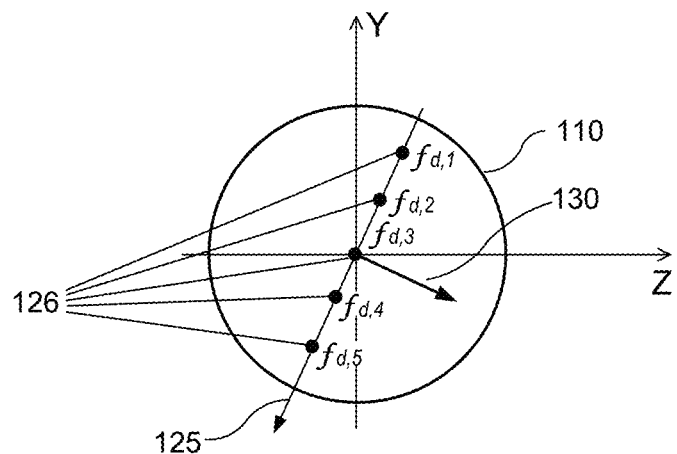

FIG. 4 A spectrogram of the Doppler signal received from the translation motion compensated spinning sports ball of FIGS. 2-3;

FIG. 5 shows a flow chart of a method of use of the system of FIG. 1;

FIG. 6 shows a side view of a radar and a spinning sports ball of the system of FIG. 1 according to another exemplary embodiment of the present invention;

FIG. 7 shows a frequency spectrum of the sports ball of FIG. 6 separated into multiple frequency components;

FIG. 8 shows the average relative positions of each of the frequency components of FIG. 7 mapped onto the sports ball of FIG. 6;

FIG. 9 shows the average relative positions of different frequency components of a ball with pure backward spin.

FIG. 10 shows a spectrogram of the Doppler signal received from the translational motion compensated spinning ball of FIG. 9.

FIG. 11 shows the principles of measuring angles from a phase-phase monopulse comparison.

DETAILED DESCRIPTION

The exemplary embodiments may be further understood with reference to the following description and the related appended drawings, wherein like elements are provided with the same reference numerals. The exemplary embodiments relate to a system and method for determining the spin axis of a sports ball. The sport ball might be stationary while it is spinning but will most often also have a translational motion. Although exemplary embodiments detailed herein describe the tracking of golf balls, those skilled in the art will understand that any sports balls or even non-sports related objects may be tracked with the system in the same manner.

FIG. 1 shows a first system 100 for determining a spin axis of a sports ball according to the exemplary embodiments. The first system 100 includes a radar device 102 aimed at a target area through which a sports ball is to pass during at least a part of its flight. The radar 102, in this embodiment, comprises a transmitter 104 and at least three receivers 106. The receivers 106, in this embodiment, are distributed such that receivers 106A and 106B are vertically aligned with one another and receivers 106A and 106C are aligned horizontally with one another. However, it will be understood by those skilled in the art that the receivers 106 do not need to be vertically or horizontally aligned, so long as the radar device 102 includes three or more receiver antennas where a minimum of three of the receiver antennas are not co-linear with one another. In this embodiment, the vertically aligned receivers 106A, 106B are aligned along an axis orthogonal to an axis along which the receivers 106A, 106C are horizontally aligned. However, it will be understood by those skilled in the art that the receiver pairs need not be orthogonal to one another. In this embodiment, the receivers 106 are fixed with respect to one another. As would be understood by those skilled in the art and as will be discussed in more detail below, the geometrical arrangement of the separated receivers 106A, 106B, 106C permits analysis of radar signals reflected from sports ball to the receivers 106A, 106B, 106C to derive an orientation of the spin axis of the ball (an axis about which the ball is spinning) at one or more points in time.

The radar 102 may be, for example, a continuous wave Doppler radar emitting microwaves at an X-band frequency (10 GHz) at a power of up to 500 milliWatts EIRP (Equivalent Isotropic Radiated Power), thus being compliant with FCC and CE regulations for short range international radiators. However, in other jurisdictions, other power levels and frequencies may be used in compliance with local regulations. In an exemplary embodiment, microwaves are emitted at a higher frequency between, for example, 5-125 GHz. For more precise measurements at lower object speeds, frequencies of 20 GHz or higher may be used. Any type of continuous wave (CW) Doppler radar may be used, including phase or frequency modulated CW radar, multi frequency CW radar or a single frequency CW radar. It will be understood that other tracking devices such as lidar may be used with radiation in either the visible or non-visible frequency region. Current-pulsed radar systems are limited in their ability to track objects close to the radar device. However, the distance an object must be from these pulsed radar systems has decreased over time and is expected to continue to decrease. Thus, these types of radar may soon be effective for these operations and their use in the systems of the invention described below is contemplated. Throughout the application, the tracking of objects is described based on the use of Doppler frequency spectrums. As would be understood, these Doppler frequency spectrums refer to the Doppler spectrum from any type of radar or lidar used.

The system 100 further includes a processing unit 202 which, as would be understood by those skilled in the art, may include one or more processors in communication with the radar device 102 (or multiple radar devices) via, for example, a wired or wireless connection. In an embodiment the processing unit 202 includes a computer associated with the radar device 102.

In the embodiment of FIG. 1, the system 100 is a system for determining the spin axis of a golf ball 110 hit within or into a target area from a given launch position, the target area being within a field of view of the radar 102. As would be understood by those skilled in the art, the target area does not need to be any specially created area and the launch position may be any location within or outside the field of view of the radar 102. When launched into the target area with a ball velocity direction 119 relative to the radar, the golf ball 110 travels along a flight path while spinning in a spin direction 112 around a spin axis along the z axis, as shown in FIG. 1. Those skilled in the art will understand that, although the spin of the golf ball 110 is produced by the striking of the golf ball 110 with a golf club, the same analysis may be applied to any sports ball whether it has been batted, thrown, kicked, headed, hit by any striking implement (e.g., a baseball bat) etc. In the present embodiment, the golf ball 110 in addition to a translational movement relative to the radar includes a back spin such that the top of the ball 114, at this point in time, is moving towards the radar while the bottom of the ball 116 is moving away from the radar. However, it will be understood that the golf ball 110 may spin on a spin axis oriented in any direction. The radar 102 tracks the golf ball 110 as it is launched from the launch location (if the launch location is within the field of view of the radar 102) or when the golf ball 110 enters the field of view of the radar 102 and travels along the flight path. As the golf ball 110 moves, radar signals produced by the radar 102 are reflected by the golf ball 110 and received by the radar receivers 106.

The difference between the frequency of the reflected signal and the transmitted frequency is called the Doppler shift $F_d$. The Doppler shift $F_d$ is proportional to the radial velocity (speed) $V_r$, the translational movement relative to the radar, of a reflecting point on the ball. Thus, $F_d=2/\lambda*Vr$, where $\lambda$ is the wavelength of the transmitted frequency. For a non-spinning ball, all parts of the ball are traveling at the same speed relative to the radar 102 and produce the same Doppler shift. However, for a spinning golf ball 110, various parts of the ball move at different speeds relative to the radar 102, due to the rotational movement of the ball combined with the translational movement of the ball relative to the radar 102. As can be seen in FIGS. 2-3, parts of the ball that have the same velocity relative to the radar 102 are found on contour lines 118 extending around the surface of the ball. As noted previously, because the ball 110 of this embodiment has a pure back spin relative to the line of sight of the radar 102, the relative velocity associated with each contour line decreases from the bottom of the ball (having a relative velocity of $1.0*\omega*r$) to the top of the ball (having a relative velocity of $-1.0*\Omega*r$), where $\omega$ is the angular frequency equaling $2\pi$ times the spin frequency, $f_{spin}$, of the ball and r is the radius of the ball. Thus, as radar signals are reflected off the golf ball 110 to the receivers 106, the Doppler radar detects not a single velocity from the spinning ball 110, but a velocity spectrum across the range of relative velocities for the different points on the ball dictated by the spin of the ball. As a result, the signal reflected from the spinning golf ball 110 exhibits spreading of the Doppler signal around a Doppler shift corresponding generally to the translational speed of the ball (i.e. the speed of the center of mass of the ball relative to the radar); from a maximum speed at the contour line rotating most quickly away from the radar (the bottom of the ball) to a minimum speed at the contour line rotating most quickly toward the radar (the top of the ball). The corresponding Doppler spectrum received from the reflected signal may be separated into a desired number of frequency components 120 (at least two) each of which may then be mapped to a group of reflection points on the ball showing the relative velocity corresponding to each component 120 in FIG. 4. For each frequency component 120, the corresponding phase difference of the received signals in the receiver pairs can be determined. The phase difference, ΔΦ, in the received signal for a receiver pair is related to the angular position of the reflection points through the equation:

$$\Delta\Phi = 2\pi \sin(\alpha) D / \lambda \quad [1]$$

where α is the angle between the plane perpendicular to the line going through a receiver pair and a line from the receivers to the reflection point, D is the spacing between the receiver pairs (see FIG. 11) and λ is the wavelength of the transmitted signal. This way of determining the angular position is also called the phase-phase monopulse comparison principle or interferometry. In FIG. 11 only the two receivers 106A and 106B are shown, but same principle can of course be used for receiver 106A and 106C or any other receiver. As such, a set of angular positions can be obtained from said phase difference in the receiver pairs. These angular positions correspond to different reflection points on a ball and define the principal axis of the spinning ball, which is perpendicular to a plane containing the 3D spin axis. This plane is divided into two half planes by the line-of-sight from the radar to the ball, the half plane containing the 3D spin axis (identified as described below) is called the spin axis half plane. The principle axis and spin axis half plane depends only on the 3D spin axis of the ball and the direction from the radar to the ball. They will be described in further detail below.

The accuracy of the angular determination dα of α, needs to be sufficient to enable resolution of angular positions on the ball 110 from each other. The angular extend $\alpha_{ball}$ of a ball 110 with radius r at a distance to the radar R is given by: $\alpha_{ball} = a\sin(2r/R)$. Since a phase difference ΔΦ between signals can be determined with only limited accuracy dΦ which depends on the signal-to-noise ratio, it is necessary for the distance D between the receivers 106A-C to be sufficiently large compared to the wavelength in order to provide high enough resolution of the angular determination of α, so $d\alpha < \alpha_{ball}$. Inserted in equation [1], this means D generally needs to satisfy equation [2].

$$D > \frac{R}{2r} \lambda \cdot d\Phi / 2\pi \quad [2]$$

A typical embodiment of the current invention measures the spin axis of a golf ball having a radius of around 21 mm, at a distance of approximately 4.2 m away from the receivers 106A-C. In this embodiment, a phase difference accuracy of 2π/50 of the phase difference determination would require the distance D between the receivers 106A-C according to equation [2] to be more than 2 times the wavelength λ which is a quite feasible radar design. It is noted that equation [2] is not an absolute requirement, since other means can be used to increase the angular accuracy, such as averaging over time.

For example, consider the setup illustrated in FIGS. 2-3. The system shows a radar 102 and a ball 110 spinning around a spin axis 130 orthogonal to the line of sight of the radar 102 (the orientation of the spin axis vector will be generalized later). It is noted that, in the present embodiments, only the relative motion of the surface of the ball due to spin is considered, and as such, the movement of the center of the ball relative to the radar 102 is not included. A Cartesian coordinate system is, in this example, defined with the x-axis parallel to the line of sight, the z-axis parallel to the spin axis 130 and the origin as the center of the ball 110, the y-axis completing a right-hand oriented Cartesian coordinate system. As shown in FIG. 3, the position of a reflection point 122 on the surface of the ball 110 as it rotates around the spin axis 130 at any time, t, is given by the coordinate vector:

$$X_c(t) = \begin{pmatrix} x(t) \\ y(t) \\ z(t) \end{pmatrix} = \begin{pmatrix} \sqrt{r^2 - z^2} \cdot \cos\omega t \\ \sqrt{r^2 - z^2} \cdot \sin\omega t \\ z \end{pmatrix},$$

where $X_c$ is the coordinate vector, r is the ball radius and ω is the angular frequency due to spin. To obtain the relative velocity 124, $V_c$, of the point 122 on the surface of the golf ball 110, we need to differentiate the coordinate vector, $X_c$, with respect to t:

$$V_c(t) = \frac{d}{dt} X_c(t_0) = \begin{pmatrix} v_x(t) \\ v_y(t) \\ v_z(t) \end{pmatrix} = \begin{pmatrix} -\omega \cdot \sqrt{r^2 - z^2} \cdot \sin\omega t \\ \omega \cdot \sqrt{r^2 - z^2} \cdot \cos\omega t \\ 0 \end{pmatrix} = \begin{pmatrix} -\omega \cdot y(t) \\ \omega \cdot x(t) \\ 0 \end{pmatrix}.$$

The velocity component observed from the radar 102 is the component parallel to the line of sight of the radar 102, which in this case is the x-component of $V_c$. Since this component is equal to $-\omega \cdot y(t)$, velocity contour lines 118 are all in planes parallel to the xz-plane as shown in FIG. 2, i.e. the plane spanned by the line of sight vector (x-axis) and the spin axis vector 130 (parallel to the z-axis in this example).

However, in some situations, the spin axis 130 will not be parallel to the z-axis. In the case where it is not required that the spin axis vector, u, is parallel to the z-axis, the normalized spin axis vector may be represented by û, given by:

$$\hat{u} = \begin{pmatrix} u_x \\ u_y \\ u_z \end{pmatrix}$$

In this general case, the coordinate vector, $X_c$, for a point on the surface of a ball, as it rotates around û at time, t, is given by:

$$X_c(t) = \begin{pmatrix} x(t) \\ y(t) \\ z(t) \end{pmatrix},$$

where:

$x(t) = x_0(\cos\omega t + u_x^2(1 - \cos\omega t)) +$ $\quad y_0(u_x u_y (1 - \cos\omega t) - u_z \sin\omega t) + z_0(u_x u_z(1 - \cos\omega t) + u_y \sin\omega t)$ $y(t) = x_0(u_x u_y(1 - \cos\omega t) + u_z \sin\omega t) +$ $\quad y_0(\cos\omega t + u_y^2(1 - \cos\omega t)) + z_0(u_y u_z(1 - \cos\omega t) - u_x \sin\omega t)$ $z(t) = x_0(u_x u_z(1 - \cos\omega t) - u_y \sin\omega t) +$ $\quad y_0(u_y u_z(1 - \cos\omega t) + -u_x \sin\omega t) + z_0(\cos\omega t + u_z^2(1 - \cos\omega t))$ and $$X_c(0) = \begin{pmatrix} x_0 \\ y_0 \\ z_0 \end{pmatrix}$$

As stated previously, only the velocity component along the line of sight (i.e. the x-component of the velocity vector) creates a Doppler shift and is of interest in this example:

$$v_{x(t)} = \frac{d}{dt}x(t) = \omega[x_0(-\sin\omega t + u_x^2\sin\omega t) +$$
$$y_0(u_xu_y\sin\omega t - u_z\cos\omega t) + z_0(u_xu_z\sin\omega t + u_y\cos\omega t)]$$

The expression between the squared brackets is equal to $u_y*z(t) - u_z*y(t)$, and therefore:

$$v_x(t) = \omega[u_yz(t) - u_zy(t)] \Rightarrow$$
$$\frac{v_x(t)}{\omega} = -u_z \cdot y(t) + u_y \cdot z(t)$$

Consequently, each position $X_c$ of points belonging to a velocity contour line, i.e. constant $v_x(t)$, lies in a plane with a normal vector, n, called the principal axis vector of the spinning ball given by:

$$n = \begin{pmatrix} 0 \\ -u_z \\ u_y \end{pmatrix}$$

Note that n depends on the 3D spin axis and the direction from the radar to the ball. For each velocity contour, the average of the corresponding positions defines an averaged point which, when combined with the averaged points for the other velocity contours, defines the principal axis vector of the spinning ball n. The direction of the principal axis vector n is defined by the arrangement of the averaged points for the velocity contours in ascending order of the relative frequency of the velocity contours.

Each of the velocity contour lines found is associated with frequency components of the received Doppler signal. Specifically, as will be further described below, the received Doppler signal can be split into any number of frequency components 120 (at least two), as shown in exemplary FIG. 4. This splitting of the Doppler signal may be done by any known method such as, for example, utilizing the Short Time Fourier Transformation (STFT). Each of these frequency components 120 is believed to correspond effectively to the average position of the velocity contour lines. The angular position associated with each of these frequency components is a weighted average position of all reflection points corresponding to the portion of the signal. These angular positions are obtained from phase differences between receiver pairs as discussed above, and these positions will form a line approximating the principal axis of the spinning ball n. The principal axis of the spinning ball n is perpendicular to the plane containing the 3D spin axis. Since the direction of the principal axis of the spinning ball n is known, corresponding to e.g. top- or back-spin, only half of the plane perpendicular to n can contain the 3D spin axis, this half plane is called the spin axis half plane.

Having determined n provides also a projection of the spin axis onto a plane perpendicular to the line of sight from the radar, what is not yet known at this point is the $u_x$ component of the spin axis. To determine the 3D spin axis various approaches can be done with a few examples given below.

1. Determine $u_x$, such that u is perpendicular to the velocity vector V of the ball in flight. In this case the determined spin axis will possess no rifle- or gyro-spin. This is in many cases, for example a golf shot, a fairly valid assumption and, even if this assumption is not valid, the effect of the 3D spin with this assumption will result in aerodynamics with behavior substantially equivalent to aerodynamics obtained with the correct 3D spin axis. So, as a for practical use for determining the impact of the 3D spin axis orientation on the flight of the ball this is very useful.

2. Estimate the amount or percentage of rifle-spin by other means. The rifle spin can be estimated by correlating aerodynamical behavior of the ball to a predetermined spin rate of the ball, or by using optical tracking of the ball recognizing patterns on the ball from frame to frame. Alternatively, the rifle percentage of rifle spin can be estimated by comparing the total frequency bandwidth BW ($=f_{d,F}-f_{d,A}$ in FIG. 7) with the expected bandwidth with zero rifle spin ($BW_{noRifle}=2*\omega*r$) based on a predetermined spin rate and radius of the ball, $BW=\cos(\theta)*BW_{noRifle}$ where $\theta$ is the rifle spin angle. Yet other alternative is to predetermine or assume the rifle spin rate or percentage.

3. Under the assumption that the 3D spin axis vector is constant in a given time interval, the principal axis n is determined at at least two different points in time during flight where at least two of these principal axis n define non-parallel half-spin planes. The 3D spin axis being the intersection of the spin axis half planes each being normal to the determined principal axis n. This approach assumes the spin axis to be quasi-constant over time, which for most applications is a valid assumption.

4. Determine the principal axis n from at least two different locations at the same point in time, where at least two of these principal axes are non-parallel, resulting in the intersection of the corresponding half-planes along a line parallel to the 3D spin-axis vector. The two different locations can be obtained by having two radar systems 102 connected to the processing unit 202 or by increasing the number of receivers 106 and having them sufficiently separated to achieve non-parallel spin axis half plane determinations.

A flow chart of a first exemplary method for determining the spin axis of the spinning golf ball is depicted in FIG. 5. In this embodiment, a multi-receiver radar setup is utilized including three receiver antennas 106A, 106B, 106C mounted in a plane. Optionally, additional receiver antennas may be used to increase the accuracy of the determined positions and to derive a three-dimensional (3D) spin axis. Initially, in step 200, the radar 102 produces signals which are transmitted into a target area and received after reflection from a spinning golf ball 110 by the receivers 106A, 106B, 106C generating a corresponding signal exhibiting a Doppler frequency spectrum. In this embodiment, the ball is moving away from the radar. However, it will be understood that the ball may be stationary or moving in any direction relative to the radar 102. Due to the spinning motion of the ball, the received Doppler signal is broadened around a value of the Doppler shift associated with the translational motion of the ball relative to the radar 102. That is, the reflected signals will be spread across a range of frequencies reflecting the range of relative velocities of different parts of the ball as it is spinning and moving relative to the radar 102.

In step 205, after the signal has been received by the receivers 106A, 106B, 106C, a frequency analysis is performed on the received signal. In an exemplary embodiment, a Fast Fourier Transform (FFT) may be used. As noted above, due to the spin of the ball, the frequencies of the received signal are spread through a range which may then be separated into a desired number of frequency components. FIG. 10 depicts a spectrogram of the received frequencies from the golf ball moving away from the radar exhibiting pure back spin. The received frequencies in the spectrogram in FIG. 10 being shown relative to the frequency corresponding to the speed of the ball (the translational movement). In this example, as shown in FIG. 6, the bottom (point F) of the ball is spinning away from the radar, which means that reflections from the bottom part of the ball have the largest positive Doppler shift relative to the speed of the ball, while reflections from the top (point A) of the ball, which is spinning toward the radar have the most negative Doppler shift relative to the speed of the ball.

In the optional step 210, a motion compensation of the received Doppler signal is performed to subtract the average motion of the ball 110 (translation of the ball relative to the radar, i.e. corresponding to the speed of the ball) from the signal. This motion compensation centers the Doppler signal of the ball 110 around 0 Hz and may be done in any of a variety of ways through standard techniques known by those skilled in the art. FIG. 10 shows the spectrogram after motion compensation has been carried out, thus the center frequency in the signal from ball is now 0 Hz. This motion compensation step is optional, since it is only the relative Doppler shift inside the broadened Doppler spectrum from the spinning and moving ball that matters. However, performing a motion compensation may provide some practical implementation advantages.

In step 215, the received signal is separated into a desired number of frequency components 120. As previously noted, the broadening in the frequencies of the received signals results from the different velocities of different points on the surface of the ball as observed by the radar while the ball spins. Reflection points on the same velocity contour line are associated with the same frequency component of the Doppler signal. That is, each velocity contour line is associated with a different part of the frequency spectrum. For example, looking to FIG. 6, a plurality of reflection points A, B, C, D, E, F are shown positioned at different locations on an outer surface of the ball. Depending on the spin of the ball, each of these reflection points will have a different velocity relative to the radar. As seen in FIG. 6, because of the back spin of the ball, after compensating for the translation of the ball, the ball has a maximum positive velocity at point F where the ball is spinning away from the radar, and a maximum negative velocity at A, where the ball is spinning toward the radar. Point C, which is just above the mid-line of the ball exhibits the smallest negative velocity while point D, which is just below the mid-line of the ball exhibits the smallest positive velocity. Furthermore, due to the spin of the ball, each reflection point, A, B, C, D, E, F corresponds to a separate velocity contour line 142. For example, point B corresponds to contour line 142B such that point B has the same relative velocity as every other point on the surface of the ball along contour line 142B. Similarly, point C corresponds to contour line 142C such that point C has the same velocity relative to the radar 102 as every other point along contour line 142C, while points D and E correspond to contour lines 142D and 142E, respectively, such that every point positioned along contour line 142D exhibits the same velocity relative to the radar 102 as point D and every point positioned on contour line 142E exhibits the same velocity relative to the radar 102 as point E. For each frequency component 144, a 3D angular position relative to the radar of the velocity contour lines associated with each component of constant velocity is determined by analyzing phase shifts associated with the signals exhibiting the corresponding velocity based on a comparison of signals received by each of the receiver pairs 106 and these angular positions can be mapped onto the ball 110, as shown in FIG. 8. Specifically, these phase shifts are used to assign each of the various frequency components 144 to different angular positions 126 on the ball 110. The phase shift may be used to determine positions on the ball 110 corresponding to the frequency components 144. Since each frequency component 144 spans a corresponding range of velocity contours 142, the angular position determined for each frequency component 144 will effectively be an averaging of the points belonging to each of the velocity contours in this range. In the plane perpendicular to the line of sight of the radar, the averaging of the points on each contour line 142 defines a position 126 that belongs to a line 125, the principal axis of the spinning ball, perpendicular the spin axis 130. It is noted that while, in this embodiment, the signal is split into five frequency components 144, one skilled in the art would understand that the signal may be split into any number (at least two) of frequency components 144 so long as the parts are distributed inside the broadened Doppler spectrum due to spin of the ball.

In step 220, the relative angular positions from step 215 are generally grouped along a line in the yz-plane. This this line is called the principal axis of the spinning ball, n, and is perpendicular to the plane containing the 3D spin axis vector, the angular positions is fitted with a line in the yz-plane. The scaling from angular positions to y,z coordinates is not important and can be omitted, since it is only the orientation of the line of the principal axis in the yz-plane, which is necessary to determine the principal axis n. Due to noise in the measurements (which can be reduced using known noise-reduction techniques, e.g., by application of a band-pass filter or a low-pass filter), these positions will generally deviate from the ideal line. However, a line can be determined using, for example, a linear fit of the positions, as shown in FIGS. 8-9. It may be useful, in some cases, to utilize angular positions from several time steps during a time interval selected so that any change in line of sight during this time interval is insignificant. The direction of the principal axis vector n is determined by the angular positions of corresponding frequency components in increasing order of relative frequency.

From the principal axis vector n the spin axis half plane can be identified as the plane perpendicular to n, and which has been cut in half by the line-of-sight from the radar (the x-axis), with the spin half plane being the side containing) the vector product of n and the x-axis unity vector. The spin axis half plane is consequently fully described by the principal axis vector n and the x-axis unity vector, i.e. the line of sight.

The line-of-sight from the radar 102 to the ball 110 has been defined as parallel to the x-axis. However, in most cases with a moving ball, the line-of-sight from the radar will change its orientation relative to world coordinates as the ball moves. In step 225, the spin axis half plane is coordinate transformed to real-world coordinates. This means the principal axis n and the line-of-sight direction (the x-axis) of the radar to the ball are converted into the desired coordinate system. The real-world coordinates can be, but are not necessarily, defined by the motion of the ball. Such coordinates are often used as the orientation of the spin axis is primarily interesting in relation to the motion of the ball. That is, by determining the axis about which the ball is spinning, the system can use this axis along with a detected spin rate to calculate the effect this spin will have on the path of travel of the ball. In fact, simply knowing the projection of the spin axis onto the plane perpendicular to the velocity vector of the ball 119, the system can approximate the aerodynamical effects of the spin on the balls deviation right or left, and up or down of an initial flight path of the ball and may be used, for example, to enhance the accuracy of a simulated projection of the continued flight of the ball after the spin axis determination has been made. Those skilled in the art will recognize that this may be useful in golf simulation games where only a short portion of the flight of the ball is detected with a continuation of the flight of the ball then projected into a simulated environment. This system may also be useful in enhancing the tracking of golf balls by, for example, automated cameras or by illustrating a predicted path of the ball to a camera operator, the system may enable manually operated cameras to more accurately track balls and may also assist in the tracking of balls by an automated camera tracking system. By measuring the spin axis and the spin rate while also 3 dimensionally tracking the ball, one can get detailed insight into the different components which impact the ball trajectory such as wind, temperature, ball aerodynamic properties etc.

In step 230, the identified spin axis half plane is used to determine the 3D spin axis. This step can be done in at least 4 alternative ways. In the first alternative, the 3D spin axis is required to be perpendicular to the velocity vector of the ball, whereby the rifle- or gyro-spin is assumed to be zero. This first method does further require the direction of the velocity vector of the ball to be determined.

In the second alternative of step 230, the amount of rifle- or gyro-spin is determined by other means. The rifle spin can be estimated by correlating aerodynamical behavior of the ball to a predetermined spin rate of the ball, or by using optical tracking of the ball recognizing patterns on the ball from frame to frame. Alternatively, the rifle spin rate or percentage can be predetermined or assumed to be a certain reasonably expected value.

In the third alternative of step 230, different spin axis half planes have been obtained over more than one time step, the 3D spin axis orientation can be determined. Deriving the 3D spin axis orientation by the third alternative relies on the assumption that the orientation of the spin axis vector in real world coordinates is substantially constant over time due to the gyroscopic effect. It is further required that the spin axis half planes are non-parallel in at least two of the time steps. The 3D spin axis is identified as the intersection of the determined spin axis half planes.

In the fourth alternative, if multiple radars or more than 3 receivers in a single radar unit are used, multiple spin axis half planes can be determined at the same time. The 3D spin axis can be determined as the intersection of the determined spin axis half planes. This can be done unambiguously as long as the spin axis half planes are non-parallel to one another.

It is observed that the principle axis of the spinning ball is a unit vector in the direction of the derivative vector of the angular position with respect to frequency of the Doppler signal received from the ball. In another aspect of the invention, the principle axis is determined by calculating based on a frequency analysis of the received signal, the derivative of the phase differences observed at the receiving antennas with respect to frequency and from this calculating the principle axis of the ball based on knowledge of the angular position of the ball.

The angular positions used for the latter calculation may be determined from the received signal as previously described, preferably using the phase differences observed at the center frequency of the received Doppler bands or by averaging the received phase differences across the Doppler band. Note that in contrast to previously described methods, this method requires only a single angular position needs to be determined.

In yet another aspect of the invention the angular position of the ball does not to be determined from the radar signal but can be supplied by other means. In one embodiment the angular position can be determined from a camera embedded in the radar unit or by having a camera external to the radar, the external camera supplying a measurement of the angular position as input to the radar or a video signal from which the angular position can be determined. In another embodiment where a multi-radar setup previously described for determining the 3D spin axis is employed, the position of the ball may be determined by a first radar and supplied to a second radar as input, the second radar calculating based on the ball position the angular position of the ball.

In yet another embodiment, the angular position can be assumed from the radar placement and knowledge of the target area and need not be calculated or input in order to determine the principle axis. This could be the case if the radar is placed such a way that the trajectory of the ball is largely in a well-known radial direction from the radar or if the ball is known or can be determined to be in a certain location at a point in time.

It will be appreciated by those skilled in the art that changes may be made to the embodiments described above without departing from the inventive concept thereof. It should further be appreciated that structural features and methods associated with one of the embodiments can be incorporated into other embodiments. It is understood, therefore, that this invention is not limited to the particular embodiment disclosed, but rather modifications are also covered within the scope of the present invention as defined by the appended claims.

What is claimed is:

1. A method for determining a spin axis of a sports ball, comprising:
   transmitting a signal, via a first radar, into a target area into which the sports ball is to be launched, the first radar including three receivers arranged so that a minimum of three receivers are not co-linear, the signal being reflected back to the receivers by the sports ball;
   receiving, by the first radar, the received reflected signal via the receivers;
   performing a frequency analysis on the received reflected signal received by the first radar at a first point in time to determine a frequency spectrum comprising a range of frequencies received by the first radar corresponding to differing velocities relative to the first radar of different portions of the sports ball as the sports ball is spinning;
   separating the determined frequency spectrum into a plurality of frequency components; and
   determining for each of the frequency components a first phase difference between signals received at a first pair of the three receivers and a second phase difference between signals received at a second pair of the three receivers and identifying a component of the spin axis of the sports ball based on the determined first and second phase differences.

2. The method of claim 1, wherein the component of the spin axis is identified as a projection of the spin axis of the sports ball onto a plane perpendicular to a line of sight from the first radar to the sports ball.

3. The method of claim 2, wherein the projection of the spin axis of the sports ball is identified as a line perpendicular to a line represented by the determined first and second phase differences.

4. The method of claim 1, further comprising performing a motion compensation of the received reflected signal to subtract an average motion of the sports ball from the signal.

5. The method of claim 4, wherein the motion compensation centers the received reflected signal around 0 Hz.

6. A method for determining a spin axis of a sports ball, comprising:
transmitting a signal, via a first radar, into a target area into which the sports ball is to be launched, the first radar including three receivers arranged so that a minimum of three receivers are not co-linear, the signal being reflected back to the receivers by the sports ball;
receiving, by the first radar, the received reflected signal via the receivers;
performing a frequency analysis on the received reflected signal received by the first radar at a first point in time to determine a frequency spectrum comprising a range of frequencies received by the first radar corresponding to differing velocities relative to the first radar of different portions of the sports ball as the sports ball is spinning;
separating the determined frequency spectrum into a plurality of frequency components; and
identifying for each of the frequency components a velocity contour line on a surface of the sports ball, each velocity contour line corresponding to a plurality of reflection points on the surface of the sports ball with the same relative velocity based on a phase difference detected between signals received by a first pair of the receivers of the first radar and signals received by a second pair of the receivers of the first radar.

7. The method of claim 6, further comprising identifying as a projection of the spin axis of the sports ball onto a plane perpendicular to a line of sight from the first radar to the sports ball, a line perpendicular to a line represented by the determined phase differences.

8. The method of claim 6, further comprising averaging locations positioned on each contour line to define a point within the corresponding plane, a set of points from each velocity contour line corresponding to a line perpendicular to the spin axis.

9. A method for determining a spin axis of a sports ball, comprising:
transmitting a signal, via a first radar, into a target area into which the sports ball is to be launched, the first radar including three receivers arranged so that a minimum of three receivers are not co-linear, the signal being reflected back to the receivers by the sports ball;
receiving, by the first radar, the received reflected signal via the receivers; and
performing a frequency analysis on the received reflected signal received by the first radar and, based on the frequency analysis, calculating a derivative of phase differences observed at the receivers with respect to frequency and, based on this derivative, identifying a spin axis of the sports ball.

10. The method of claim 9, further comprising, based on the phase differences relative to the first radar, determining the spin axis of the sports ball in a world coordinate system.

11. The method of claim 9, further comprising determining aerodynamical effects on a flight path of the sports ball based on the identified spin axis of the sports ball and a spin rate of the sports ball.

12. The method of claim 11, further comprising generating a simulated projection of a continued flight path of the sports ball after the determination of the spin axis.

13. The method of claim 12, further comprising providing to a camera operator an illustrated flight path of the sports ball to enhance tracking of the sports ball via a camera.

14. The method of claim 12, further comprising automatically controlling a camera to track the sports ball based on the simulated projection of the continued flight path of the sports ball.

15. The method of claim 9, further comprising deriving a first spin axis of the sports ball at a first point in time and a second spin axis of the sports ball at a second point in time and combining the first and second spin axes to determine a three-dimensional spin axis for the sports ball.

16. The method of claim 15, wherein the first and second spin axes of the sports ball are combined to determine the three-dimensional spin axis for the sports ball based on an assumption that gyroscopic effects render a orientation of the three-dimensional spin axis in a world coordinate system substantially constant over time.

17. The method of claim 9, wherein the spin axis of the sports ball is identified as a derivative vector of the phase difference with respect to frequency of a Doppler signal received from the sports ball.

18. A method for determining a spin axis of a sports ball, comprising:
transmitting a signal, via a first radar, into a target area into which the sports ball is to be launched, the first radar including three receivers arranged so that a minimum of three receivers are not co-linear, the signal being reflected back to the receivers by the sports ball;
receiving, by the first radar, the received reflected signal via the receivers; and
performing a frequency analysis on the received reflected signal received by the first radar and, based on the frequency analysis, calculating a derivative of differences of a time of receipt of signals at the three receivers with respect to frequency and, based on these derivatives, identifying a component of the spin axis of the sports ball based on the determined derivative.

19. The method of claim 18, wherein the component of the spin axis is identified as a projection of the spin axis of the sports ball onto a plane perpendicular to a line of sight from the first radar to the sports ball.

20. The method of claim 19, wherein the projection of the spin axis of the sports ball is identified as a line perpendicular to a line represented by the determined derivatives.

21. The method of claim 18, further comprising performing a motion compensation of the received reflected signal to subtract an average motion of the sports ball from the signal.

22. The method of claim 21, wherein the motion compensation centers the received reflected signal around 0 Hz.

* * * * *